(12) United States Patent
Clifton (10) Patent No.: US 8,894,089 B2
(45) Date of Patent: Nov. 25, 2014

(54) MULTI-PURPOSE WHEELED CONVEYANCE

(76) Inventor: Russell Anthony Clifton, Manchester (GB)

( * ) Notice: Subject to any disclaimer, the term of this patent is extended or adjusted under 35 U.S.C. 154(b) by 82 days.

(21) Appl. No.: 13/578,699

(22) PCT Filed: Feb. 9, 2011

(86) PCT No.: PCT/GB2011/050215
§ 371 (c)(1),
(2), (4) Date: Aug. 13, 2012

(87) PCT Pub. No.: WO2011/098791
PCT Pub. Date: Aug. 18, 2011

(65) Prior Publication Data
US 2012/0306181 A1   Dec. 6, 2012

(30) Foreign Application Priority Data

Feb. 15, 2010  (GB) .................................. 1002427.1
Apr. 23, 2010  (GB) .................................. 1006823.7

(51) Int. Cl.
*B62B 7/06*     (2006.01)
*B62B 5/00*     (2006.01)
*B62B 7/08*     (2006.01)
*B62B 7/04*     (2006.01)
*B62B 5/06*     (2006.01)

(52) U.S. Cl.
CPC ............... *B62B 5/0023* (2013.01); *B62B 7/044* (2013.01); *B62B 2202/24* (2013.01); *B62B 7/08* (2013.01); *B62B 5/065* (2013.01)
USPC .......................................... 280/642; 280/647

(58) Field of Classification Search
USPC ........................ 280/642, 643, 647, 648, 650
See application file for complete search history.

(56) References Cited

U.S. PATENT DOCUMENTS 3,550,997 A * 12/1970 Strand .............................. 280/30
3,713,568 A *  1/1973 Sloan ............................. 224/161
(Continued)

FOREIGN PATENT DOCUMENTS

DE    34 25 205     1/1986
EP    0 403 702     12/1990
(Continued)

OTHER PUBLICATIONS

International Search Report for PCT/GB2011/050215, mailed Jul. 27, 2011.

*Primary Examiner* — Jeffrey J Restifo
(74) *Attorney, Agent, or Firm* — Nixon & Vanderhye P.C.

(57) ABSTRACT

A conveyance is described which is intended for transporting people, primarily babies and children, though can be adapted for transporting adults, including disabled and injured people and scaled down for use as a child's toy. Its construction places it primarily within the field of wheeled conveyances with capabilities allowing it to be multi-purpose. The invention seeks to combine the functions of the people transportation conveyance and a rucksack, which can be detachably built into the rear of the seating area to carry the weight of the conveyance and child. With the conveyance folded it is put onto the back of a person and carried with the rucksack available to carry other items. With the extrusions extended the conveyance can act as a "shopping trolley" style conveyance as a carrying aid. With the front wheels raised and the seat unfolded the conveyance can be carried on the back and used as a baby carrier.

13 Claims, 9 Drawing Sheets

(56) References Cited

U.S. PATENT DOCUMENTS

| | | | | |
|---|---|---|---|---|
| 3,881,739 | A | 5/1975 | Laune | |
| 3,984,115 | A * | 10/1976 | Miller | 280/30 |
| 4,157,837 | A * | 6/1979 | Kao | 280/30 |
| 4,487,428 | A * | 12/1984 | Harada et al. | 280/648 |
| 4,586,721 | A * | 5/1986 | Harada et al. | 280/30 |
| 4,632,409 | A * | 12/1986 | Hall et al. | 280/30 |
| 4,747,526 | A * | 5/1988 | Launes | 224/155 |
| 4,762,256 | A * | 8/1988 | Whitaker | 224/161 |
| 5,433,358 | A * | 7/1995 | Millard | 224/153 |
| D365,925 | S * | 1/1996 | Roan | D3/214 |
| 5,662,339 | A * | 9/1997 | Svendsen et al. | 280/30 |
| 5,709,400 | A * | 1/1998 | Bonnier et al. | 280/650 |
| D408,335 | S * | 4/1999 | Eyman et al. | D12/129 |
| 5,964,470 | A * | 10/1999 | Syendsen et al. | 280/30 |
| 6,155,579 | A * | 12/2000 | Eyman et al. | 280/30 |
| 6,460,866 | B1 * | 10/2002 | Altschul et al. | 280/30 |
| 6,513,827 | B1 * | 2/2003 | Barenbrug | 280/648 |
| D578,936 | S * | 10/2008 | Chen | D12/129 |
| 7,543,840 | B2 * | 6/2009 | Lin | 280/639 |
| 7,543,841 | B2 * | 6/2009 | Dotsey et al. | 280/647 |
| 7,562,895 | B2 * | 7/2009 | Santamaria | 280/642 |
| 7,568,721 | B2 * | 8/2009 | Huang | 280/642 |
| 7,571,926 | B2 * | 8/2009 | Huang | 280/647 |
| 7,591,479 | B2 * | 9/2009 | Golias | 280/647 |
| 7,632,035 | B2 * | 12/2009 | Cheng | 403/98 |
| 8,226,110 | B2 * | 7/2012 | Liao | 280/642 |
| 8,276,935 | B2 * | 10/2012 | Minato et al. | 280/647 |
| 8,485,547 | B2 * | 7/2013 | Hsu | 280/647 |
| 8,517,412 | B2 * | 8/2013 | Tsai et al. | 280/647 |
| 2008/0054601 | A1 * | 3/2008 | Li | 280/642 |
| 2009/0174161 | A1 | 7/2009 | Alves et al. | |
| 2012/0025495 | A1 * | 2/2012 | Minato et al. | 280/648 |
| 2012/0032420 | A1 * | 2/2012 | Mazar et al. | 280/648 |
| 2012/0306181 | A1 * | 12/2012 | Clifton | 280/647 |
| 2013/0113188 | A1 * | 5/2013 | Liao | 280/650 |
| 2013/0147162 | A1 * | 6/2013 | Hsu | 280/647 |
| 2013/0181428 | A1 * | 7/2013 | Bost | 280/647 |
| 2013/0257019 | A1 * | 10/2013 | Eisinger | 280/650 |
| 2013/0270798 | A1 * | 10/2013 | Minato et al. | 280/650 |

FOREIGN PATENT DOCUMENTS

| | | |
|---|---|---|
| FR | 2 378 644 | 8/1978 |
| GB | 2 413 534 | 11/2005 |
| JP | 11-240453 | 9/1999 |
| JP | 2001-151119 | 6/2001 |
| WO | WO 95/29086 | 11/1995 |
| WO | WO 2009/138243 | 11/2009 |

* cited by examiner

MULTI-PURPOSE WHEELED CONVEYANCE

This application is the U.S. national phase of International Application No. PCT/GB2011/050215 filed 9 Feb. 2011 which designated the U.S. and claims priority to GB Patent Application No. 1002427.1 filed 15 Feb. 2010 and GB Patent Application No. 1006823.7 filed 23 Apr. 2010, the entire contents of each of which are hereby incorporated by reference.

This invention relates to wheeled conveyances intended for the use of transporting people, primarily babies and children (such as with prams and pushchairs), although it is easily adapted for use in equipment, such as pushchairs, for transporting adults, including disabled and injured people as well as being scaled down for use as a child's toy. Its construction places it primarily within the field of wheeled conveyances with additional features and capabilities allowing the invention to be multi-purpose in its use.

Already known and in common use are non-powered baby push-chairs, buggies and prams for children, and wheelchairs and emergency evacuation devices for disabled and injured adults. However, all known designs have some shortcomings in use, especially for the person required to push them along, which the present invention aims to overcome.

It is a common occurrence in use of the known conveyances that the occupant, whether child or disabled, or partially-abled adult, will from time to time wish to walk for varying distances, or may be compelled to do so to negotiate rough ground or obstacles such as a fence.

In other circumstances, a younger child may start a family outing willing to walk themselves, and may enjoy doing so, but the family has no option but to wheel or even carry the transportation device as well in case the child tires part way through, or to carry the child if this is not done.

Also, when the conveyances are used in a situation where additional articles are acquired, for instance during shopping, the occupant may be required to walk, or to have articles placed on top of them, if the user propelling the conveyance is not to be further encumbered with carrying of containers.

Since a make-shift answer to part of these problems appears to be that the person pushing the conveyance also wears a rucksack or carries another container, either to carry additional items such as coats or shopping, or the folded up person transportation device, if this is possible, the present invention seeks to combine the functions of both the people transportation device and that of a rucksack.

Other scenarios include walking the child to nursery and then having to push an empty buggy home and then back to the nursery to collect the child, and parents using public transport with cumbersome buggies which can be difficult to get onto buses and trains with pushchairs, containers and child.

These scenarios can act as a barrier to parents doing more activities with their children or carers with the disabled, and therefore the invention is designed to be aspirational in order to encourage parents and carers to embark on more activities with their children or patients.

Attempts to address these issues, have concentrated on reducing the weight of the standard buggy, by reducing its size, changing the way the product folds and in some cases being able to remove the wheels in order to get it into a container which can be carried.

This, however, adds to the difficulties as the product increases the number of items to be carried as the parents or carers would still need additional containers to carry their goods or other items.

In the present invention a foldable wheeled conveyance comprises a rear frame and a seat frame pivotally mounted with respect to the rear frame characterized in that the seat frame, may assume one of two stable positions with respect to the rear frame, the rear position being a locked, open, position projecting substantially forwards with respect to the rear frame and the second, folded, position being substantially adjacent the rear frame when the conveyance is folded.

The present invention is different to current designs in that the conveyance has a modified frame design to which a container can be detachably built into the rear of the seating area to carry the weight of the conveyance and child. The seat may be used as a container carried in addition to or instead of the one being fitted to the rear of the seat. Conveniently the frame of the conveyance is made from suitably stiff materials, such as aluminium extrusions, stainless steel or carbon fibre, for example, and the seat area and container carrier constructed from sturdy flexible materials such as heavy textiles or flexible plastics materials.

Ideally the seat frame, when the conveyance is folded, is within the rear frame. It can be this seen that the folded conveyance then occupies the smallest possible volume.

In this specification rear refers to the relative position of that frame when the conveyance is unfolded.

A flexible yet sturdy wheeled conveyance can be constructed with the spaced apart members each comprising separate main side members with a lower portion mounted so that it slides with respect to and may be locked with respect to said main side member to enable variation in the effective length of the spaced apart members. Such an arrangement enables easy change of the relative inclination of the seat member with respect to the rear member.

Such a foldable wheeled conveyance may conveniently have single handle mounted between the spaced apart members which can slide into hollow portions of the spaced apart members at the ends of the spaced apart members opposite the rear wheels. The handles can be lockable in position with respect to the spaced apart members to provide a convenient height when the wheeled conveyance is fully open and to slide with respect to the spaced apart members to reduce the distance from rear wheels to handle when the conveyance in a folded position.

Weight is minimized if the conveyance is provided an axle on which the rear wheels passes through the spaced apart members and comprises part of the rear frame.

Beneficially the said seat frame has one or a plurality of further wheels mounted thereon on first pivots, said first pivots being substantially vertical with respect to the ground when the wheeled conveyance is in a fully unfolded condition and placed on the ground. A dog clutch, ratchet, friction conveyance or locking pin may be provided to maintain the seat frame in a desired position with respect to the rear frame.

In a particularly beneficial arrangement the spaced apart members are of substantially arcuate shape such that the pivotal mounting of the seat frame on the rear frame is forward of a line between the rear wheels and the handle(s), judged when the conveyance is in an unfolded position. Conveniently, and for lightness the seat frame is generally U-shaped and the seat frame is pivotally mounted on the rear frame at points close to the end of each arm of the U with optionally a single front wheel is at the midpoint of the U.

In a preferred arrangement the front wheel or wheels are additionally pivotal about a pivot mounting means, a pivotal axis of said pivot mounting means being substantially perpendicular to said first pivots and in which the pivot means are re lockable in at least two positions, firstly to enable the front wheels to contact the ground when the conveyance is fully open and to be retracted into the plain of the seat frame when the conveyance is in a folded position. This arrangement enables the conveyance to be folded without the front wheel(s) protruding making for very convenient carrying. Conveniently when the conveyance has a handle which may slideably mounted into hollow portions of the spaced apart members such that when folded the seat frame is contained between the spaced apart members and engages the handle.

Very conveniently the conveyance the seat frame is a seat frame and foldable seat is mounted within the rear and seat frames said seat extending below a line formed between the pivotal mountings of the seat frame in the rear frame when the conveyance is unfolded. In conjunction with the frame arrangements of this invention, a convenient container carrying area is defined in the seat which when the seat is folded enables a container to be contained within the seat area and frame. This benefit can be amplified if seat portion is mounted within an aperture within a seat pan, said seat pan being mounted on said rear and seat frames and hinged in the line formed between the pivotal mountings of the seat frame in the rear frame with further benefit if the seat is made of flexible material. With these arrangements the seat, seat frame and rear frame form a containment in which containers may be placed and supported when the conveyance is in its unfolded position.

In addition to or instead of a load carrying arrangement on the seat, the conveyance may have container carrying attachment above the rear wheels, 'above' being judged when the conveyance is unfolded. If the rear frame is arcuate the centre of gravity of any container can thus be arranged to pass though the wheels, preventing toppling yet the container will not interfere with anyone pushing the conveyance by the handles. The mounting means may conveniently be a zip one portion of which is attached to the seat the other portion of which is attached to the container. Such a container may have carrier straps by which the combination of container and conveyance may be carried when the conveyance is folded. In another configuration the conveyance itself has carrier straps to enable the conveyance to be carried on a person's back in the folded position.

It will be seen that frame can thus be provided with means to allow part of it to hinge or rotate, in order to fold, and other parts to slide over each other to achieve variations in height and angle of the conveyance in use. Wheels may be fitted to the frame to allow use as a wheeled conveyance, and these wheels can be are made foldable or removable when not required in use.

The conveyance is very slim when folded, and folding can be achieved with a single movement and can be done with a single hand. With the conveyance folded it is easily put onto the back of a person and carried with the container available to carry other items, thus leaving both the user's hands free to hold the hand of their child, for example, ensuring child safety particularly when travelling on public transport.

With the extensions extended the conveyance can act as a "shopping trolley" style conveyance which can be pulled or pushed, utilising the conveyance as a carrying aid for items. The container will provide better security for items placed in it rather than just on the seat of a pushchair or wheelchair whilst also being more manoeuvrable and compact.

With the front wheels raised and the seat unfolded the conveyance can also be carried on the back with a child seated to be used as a baby carrier. A difficulty with many known baby carriers is that once a destination is reached there is nowhere for the child to lie or sit down and therefore they are usually forced to sit on the parents lap.

In order to maintain the slim design of the invention the conveyance is reclined through adjusting the height of the extrusions at the rear of the conveyance which can be locked at different heights.

It can be readily appreciated that the described conveyance can be easily adapted to use by children or adults, depending only on its size. A miniature version for use as a toy is also an obvious extension of the idea, as is use by emergency services such as mountain rescue or the armed forces, for example.

In this specification the word "container" includes rucksacks, bags, and the like.

One embodiment of the invention will now be described with reference to the accompanying drawings, in which:

FIG. 2 shows the conveyance of FIG. 1 in a folded state with the front element folded back, the handle and lower unit retracted and the front wheel folded in;

Referring to the figures the conveyance is built around a stiff rigid rear frame 20, comprised of spaced apart members 22 themselves each comprising a hollow main member 1, with a handle 2 (one handle each per spaced apart member or a single handle as shown bridging the spaced apart members) slideably inserted into the ends of the main member 1, and two lower portions 3, joined at their lower ends by an axle 4, forming a rigid 'U' shaped assembly. The upper ends of lower portions 3 are slideably inserted into the lower ends of main side members 1. It can be seen that the handle 2 may be slid up and down within a prescribed range to adjust the amount by which handle 2 protrudes beyond the end of spaced apart members 22, and by doing so, adjust the height of the handle above the ground. Similarly, the lower portions 3 joined together by axle 4 may be slid up and down within the lower ends of main side members 1, and by doing so, also adjust the height of the whole assembly above the ground, and in addition, adjust the angle of lean or rake of the assembly with reference to the ground.

The sliding action of handle 2 and lower portions 3 in the main side members 1 can be stopped or locked by suitable means such as sprung pins, ratchet devices, friction grips or other suitable means to prevent unwanted movement (not shown). Items 1, 2, and 3 are preferably constructed from a light, rigid and visually attractive material such as aluminium alloy, stainless steel, carbon fibre or other suitable materials.

The axle 4 is provided with a pair of rear wheels, rollers or similar device at its outer ends. The axle 4 may be replaced with a strut extending between the spaced apart members 22 and stub axles outside lower portion 3 to which the rear wheels 6 are attached.

Part way up the main side members 1 is secured one side of a pair of rotational devices or pivot units 5, one to each upper main member 1, with their rotation limited to a suitable range, and capable of being locked into a chosen position by suitable means such as a dog clutch, ratchet, friction device, locking pin or other suitable means (not shown).

The element of pivot unit 5 which can rotate relative to main side member 1 carries fixed to it an end of a seat frame 7, which is preferably made from a similar material to main side members 1, handle 2 and lower portions 3. Seat frame 7 is a substantially 'U' shaped element, which has each end of it secured into the corresponding part of one of the pivot units 5.

Figure 1:
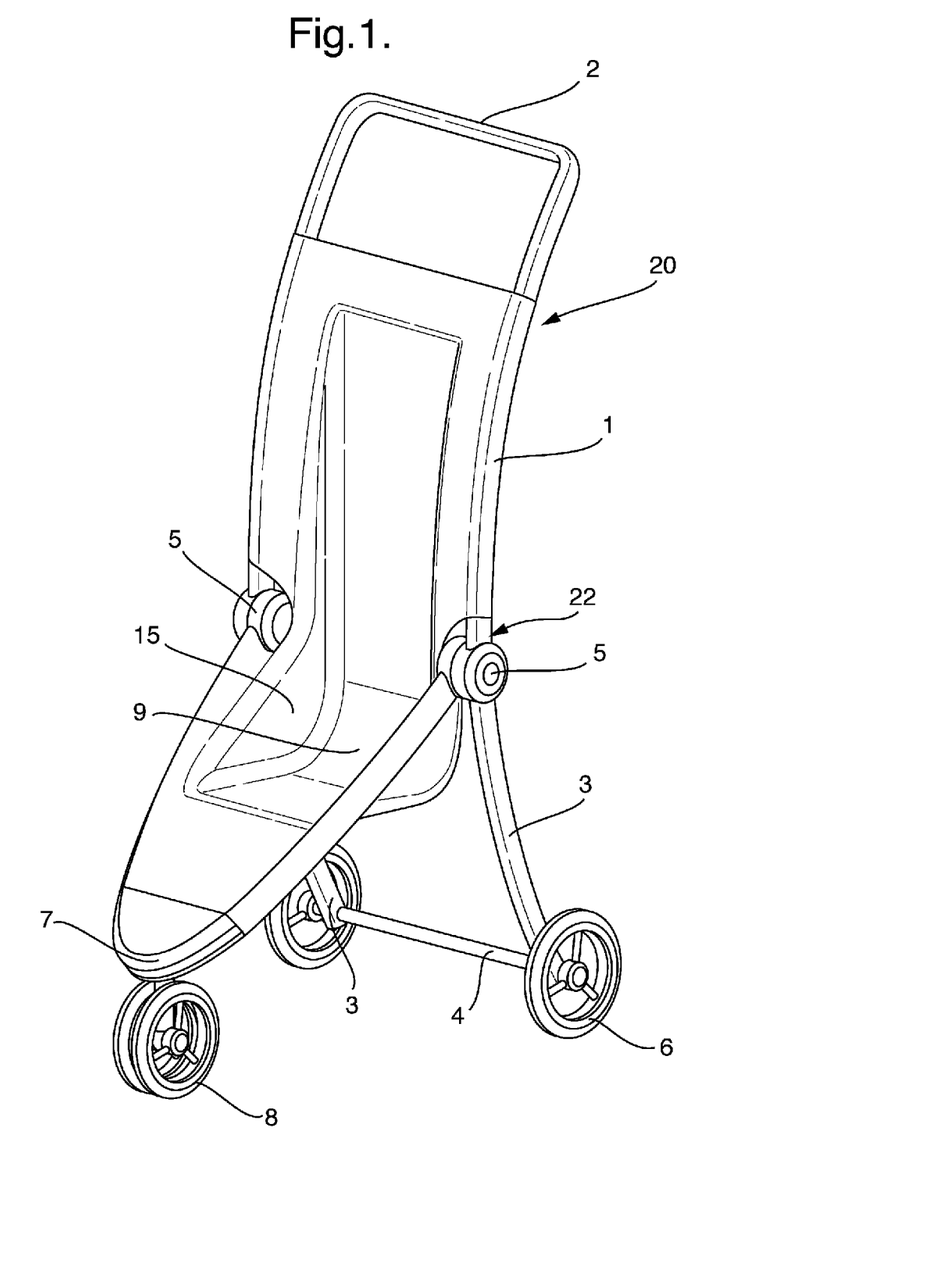
FIG. 1 shows a conveyance according to the invention in an unfolded state ready for carrying a passenger.
Figure 2:
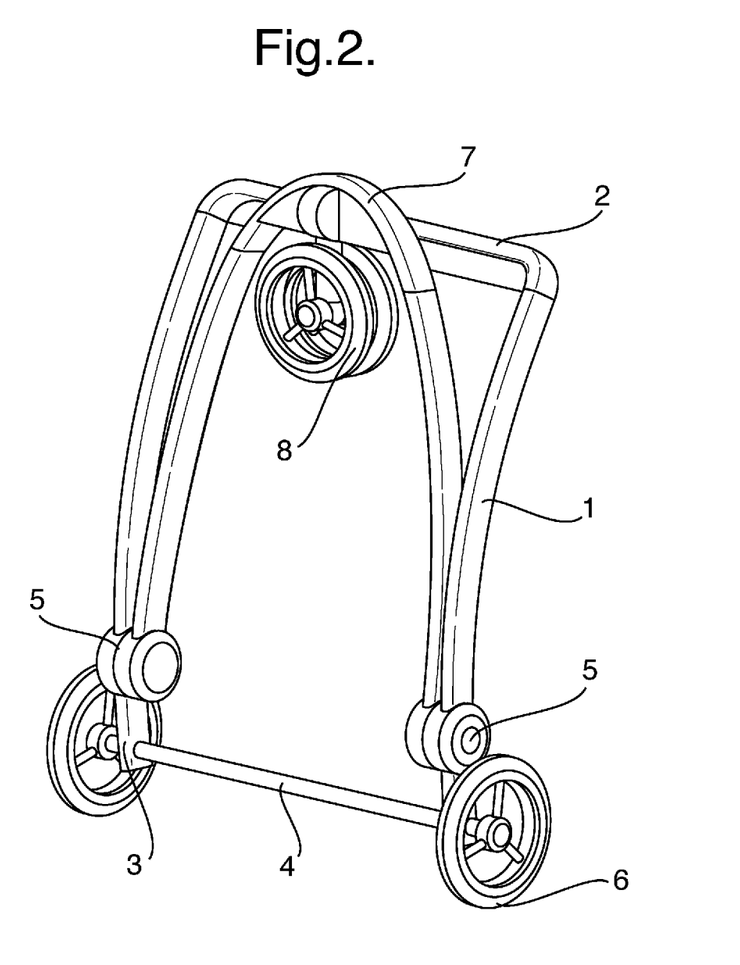

At the middle of seat frame 7, equidistant from the two pivot units 5, is mounted a wheel or pair of wheels 8, having pivotal mounting(s) 17 to allow the wheel(s) 8 to pivot about a substantially vertical axis (when the conveyance is fully open as in FIG. 1) to allow steering of the conveyance. The pivotal mounting(s) 5 also allows a lockable rotation in a vertical plane by which they can be folded up in line with the plane of seat frame 7, allowing the wheel(s) to be contained in the folded position with the seat frame 7. Attached to both main side frames 1 and seat frame 7 is a flexible membrane to form a seat 9. This is constructed of suitably resilient and flexible material to allow it to follow the folding action of the frame elements, and may set in suitable stiffening elements and moulded portions 19 so as to form a comfortable seating shape. It will also be seen that the seat 9 hanging below the moulded portion 19 forms a containment 15 supported by the seat and the rim of the aperture formed in the moulded portion into which the seat is fixed. It is preferably constructed from a tough, waterproof and easily cleaned material such as heavy duty textile or nylon, and may be a mix of materials to maximize its performance. With rotation-limiting locks on pivots 5 released, seat frame 7 may be folded back within the line of main side spaced apart members 22. Handle 2 and lower members 3 may be fully retracted into main side frames 1 and secured in that position, as shown in FIG. 2. In this case, the rigid portions of the conveyance have been reduced to approximately one half of their extended size.

Figure 3:
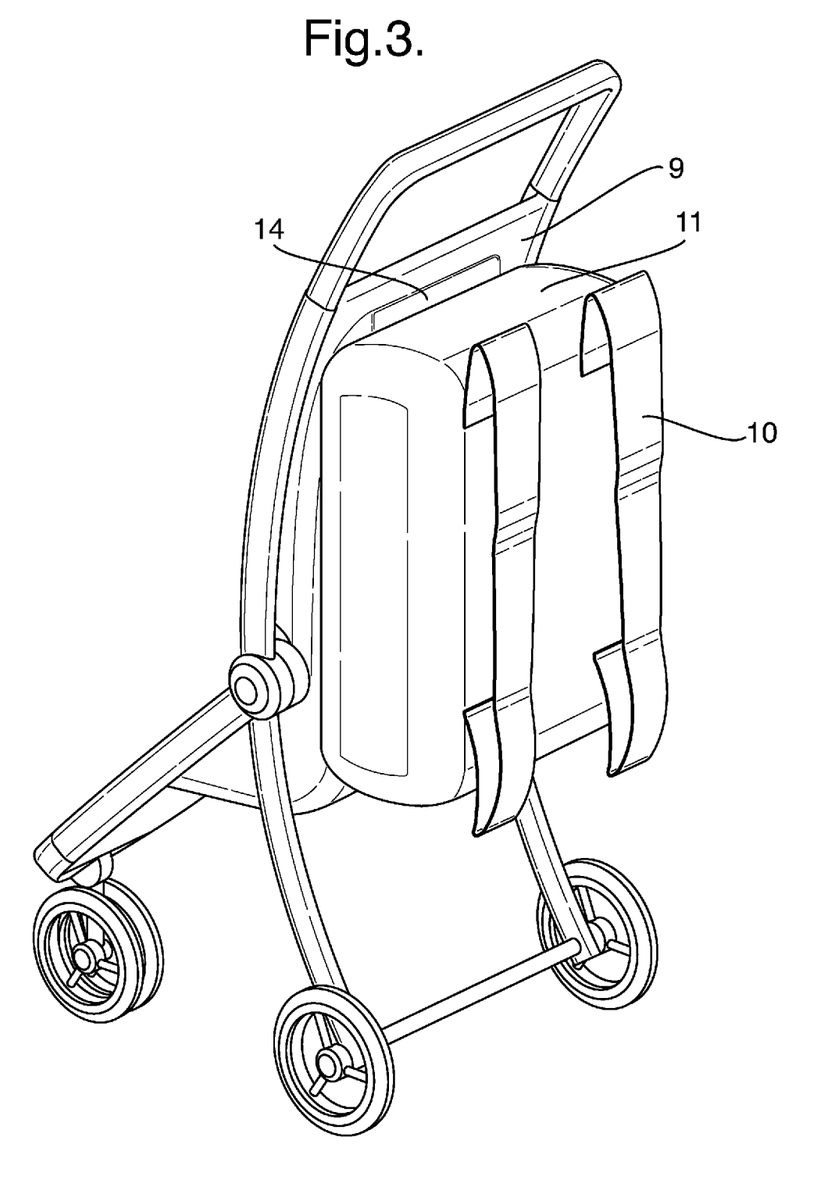
FIG. 3 is a rear view showing of the conveyance of FIGS. 1 and 2 in its unfolded state, additionally showing a potential position for a container or container to be attached.

FIG. 3 shows the conveyance with a container in the form of a rucksack 11 attached to the back of the seat 9, with two carrying or shoulder straps 10 attached to the rucksack 11. It can readily be seen that the whole conveyance could be worn on the back similar to a conventional rucksack. In this case a zip 14 is provided between the back of the seat 9 and the rucksack 11, with on half of the zip attached to the conveyance and the other to the rucksack itself. Other means of fixing a container such as a rucksack to the rear of the seat will be apparent including Velcro®, clips, straps and the like.

Figure 4:
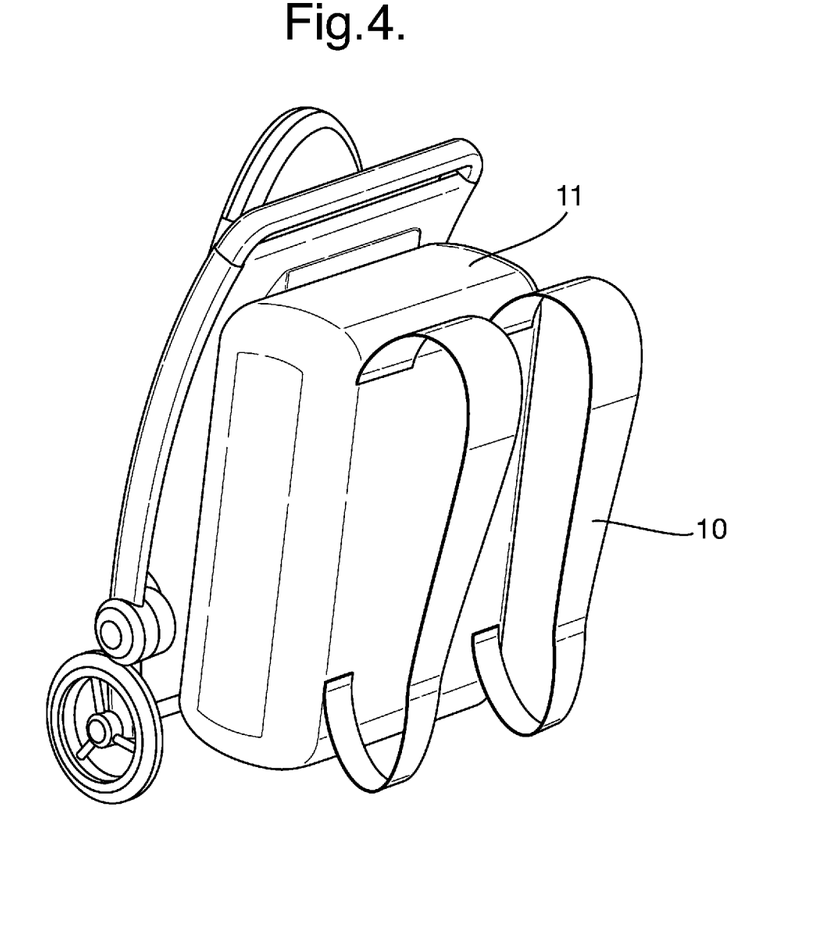
FIG. 4 is a rear view showing of the same conveyance in its folded state as FIG. 2, additionally showing a potential position for a container in the form of a rucksack to be attached.

However, as shown in FIG. 4, it would be more convenient to reduce the size of rigid frame and seat by sliding and folding the various elements in the manner described earlier. In this way, the conveyance or conveyance can be easily and conveniently carried by parent or carer when the child or disabled person does not need it.

Figure 5:
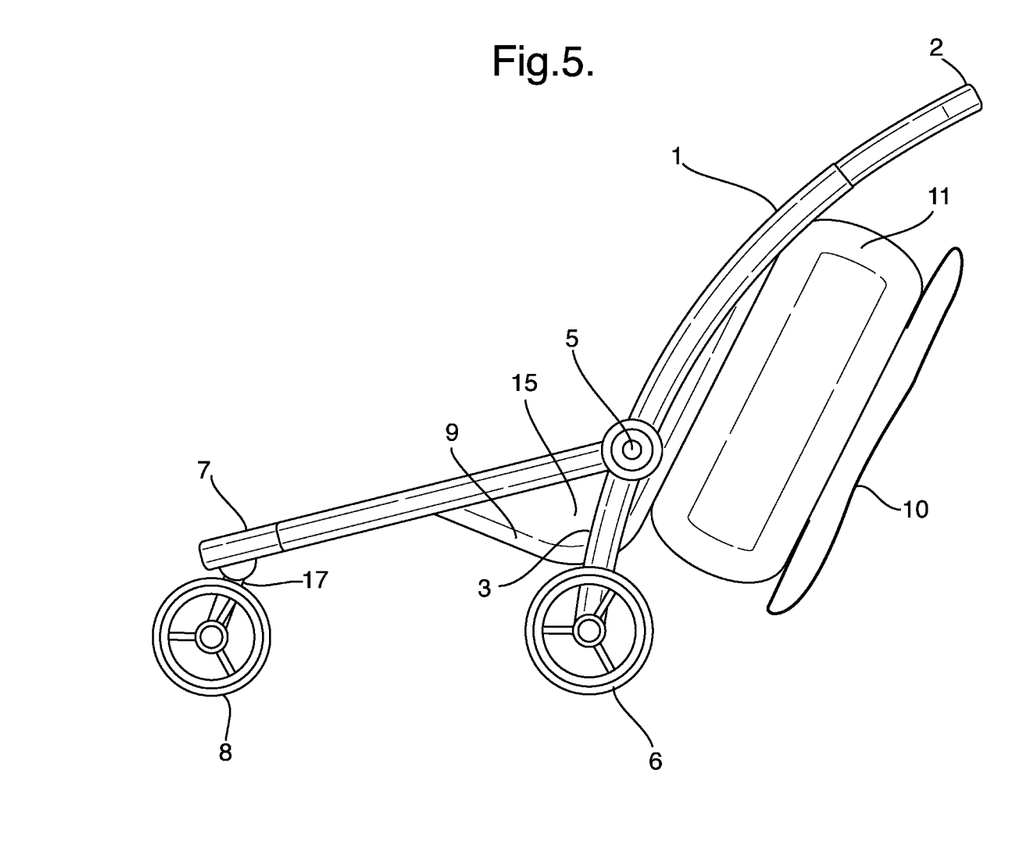
FIG. 5 is a side view showing the same conveyance in an unfolded state ready for carrying a passenger and with a container in the form of a rucksack attached, also showing the lower unit carrying the rear wheels partially retracted, achieving a degree of recline for the seat.

With the conveyance erected in the way shown in FIG. 5, the seat frame 7 is rotated down into its position for use as a seat, but the lower portions 3 are only partially slid into main side members 1 and locked. As can be seen, this achieves a degree of backward inclination or recline in the seat, which will be useful if the seat's occupant needs to relax or sleep. The handle 2 may be slid in or out of the top of main side units 1 to achieve a comfortable handle height. Also in FIG. 5, it is clear that in this preferred embodiment, the various frame members forming the main frame, handle and lower assembly are formed in a curve. This has been adopted partly for space-saving reasons, and partly for aesthetic reasons, but principally to provide a more comfortable handle position and longer wheelbase, giving added stability to the conveyance by preventing any container 11 providing a turning moment which would tend to topple the conveyance about wheels 6 at the same time as maintaining the container 11 attached to the rear of the seat clear of someone pushing the conveyance.

Figure 6:
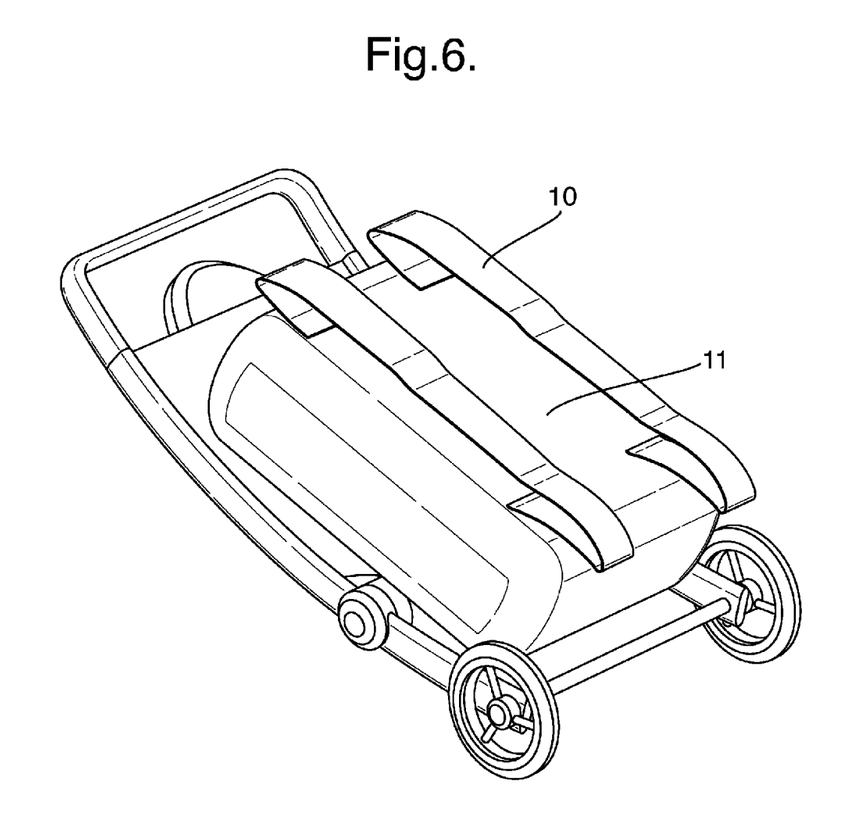
FIG. 6 shows the same conveyance in a folded state, but with the handle unit and lower unit partially extended, and the whole device rotated over so that it may be used as a transporting device such as use as a shopping trolley.

The functional features of the design of this conveyance could also be made to work satisfactorily with other frame shapes such as straight frames or a more angular shape, and it is emphasized that the embodiment shown is only one embodiment of the invention. With the seat frame 7 folded away but the handle unit 2 and lower members 3 fully extended, the conveyance can act as a convenient shopping trolley or goods carrier, as shown in FIG. 6.

Figure 7:
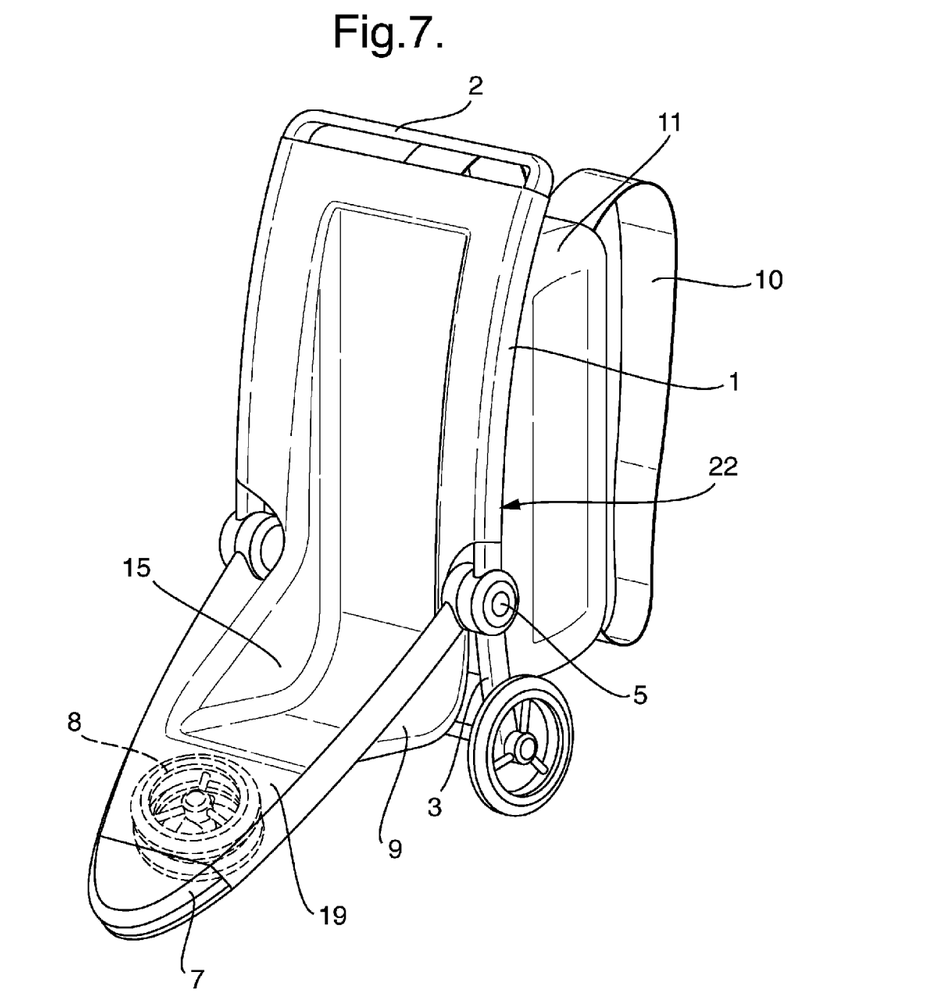
FIG. 7 shows the conveyance with handle and lower unit retracted and seat unfolded, allowing the rucksack to be worn on the back, and child to be placed in the seat and carried on the back.
Figure 8:
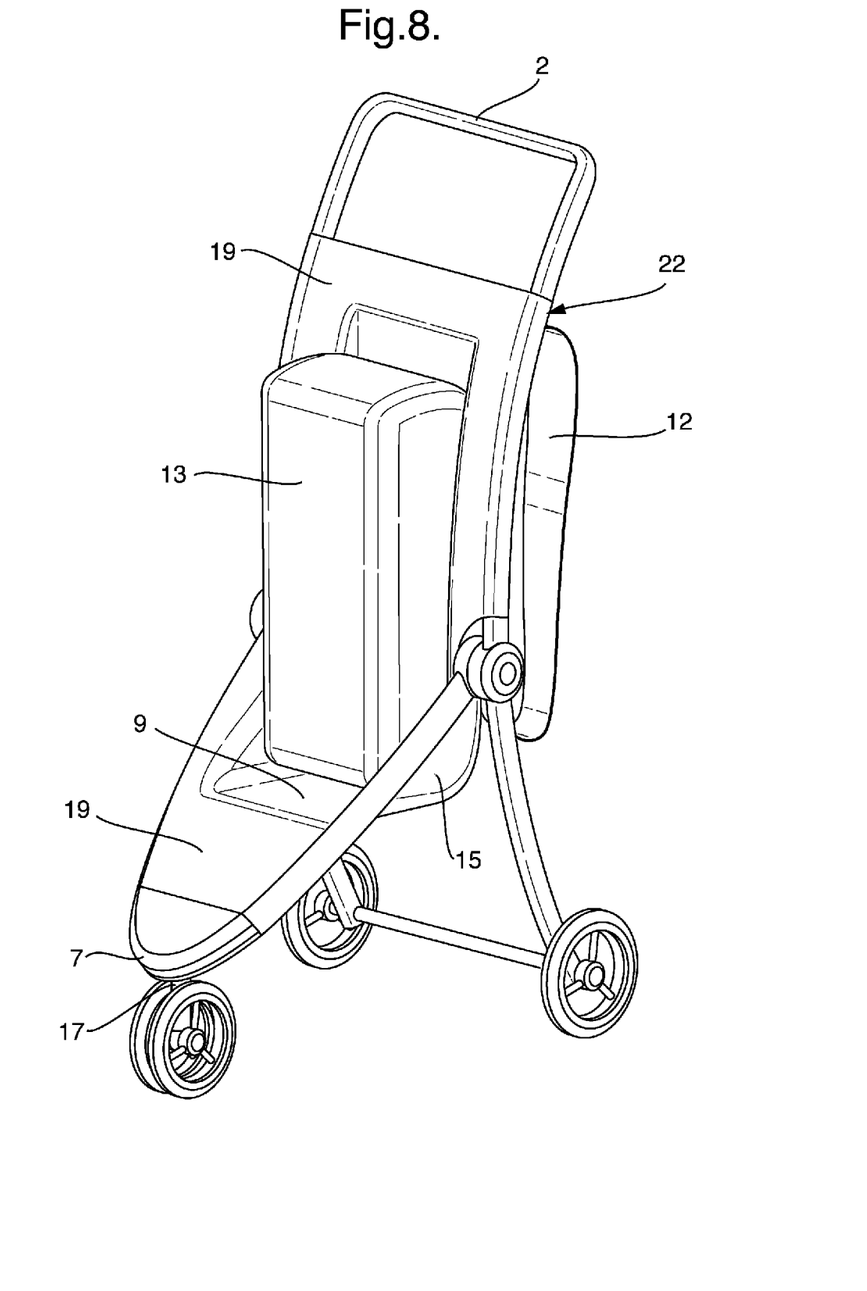
FIG. 8 shows an alternative configuration, where a container may be carried on the seat in place of a child or adult.
Figure 9:
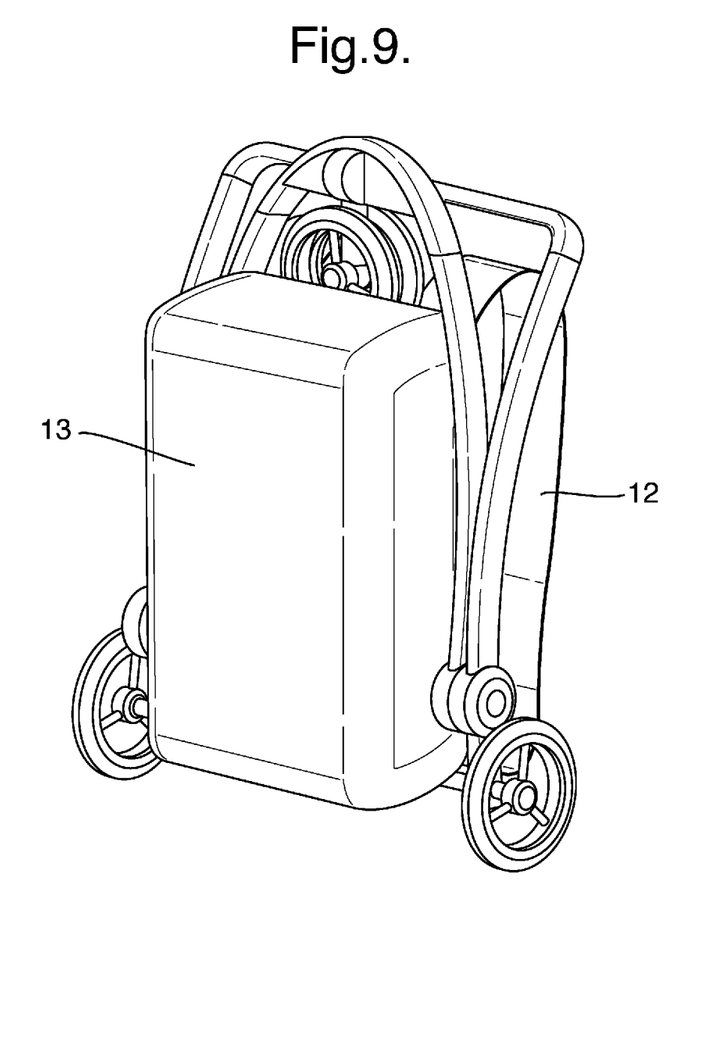
FIG. 9 shows the conveyance completely folded, illustrating an alternative position for a container.

With the seat frame 7 folded down into its lower position, wheels 8 folded, and handle unit 2 and lower portions 3 slid home into their fully retracted positions within main side members 1, as shown in FIG. 7, it can be seen that the conveyance can be worn on the back of the parent or carer, full use can be made of the carrying capacity of the container, and yet the seat can be occupied by a child and conveniently carried in addition. A child would be securely carried by use of commonly available components to form a harness (not shown).

Where a seated occupant is not present, and the conveyance could carry a container 13 detachably secured within the containment 15 as shown in FIG. 8. The whole conveyance could be then be moved on its wheels or carried on the back by means of straps 12. It can readily be seen that a rucksack could additionally be fitted in the position occupied by rucksack 11 in FIGS. 4 and 5.

If it is not required to move the conveyance shown in FIG. 8 with a container occupying the seat area by means of its wheels, then the conveyance could be fully folded and a container 13 attached to the underside of the seat and carried by straps 12 on the back. Again, a second container could be fitted in the position occupied by rucksack 11 in FIGS. 4 and 5.

In summary, the conveyance illustrated as the present invention solves the problems outlined above with presently known designs and products through its versatility and adaptability of form and function, allowing a range of configurations to be easily selected and achieved according to the circumstances met.

The version shown and described in detail above is only one possible embodiment of the invention, and the claimed result of advantages of this invention over what is known could also be achieved by a variety of detail changes to materials, detail components such as wheels and locking or rotating devices, or alternative configurations of frame shape without the introduction of any additional novelty over the present invention and illustrated device.

In addition carabanas or hooks can be attached to the handle(s) to enable more bags to be carried. This may destabilize the conveyance and, if necessary, to balance such additional weight attached to the conveyance, so called "buggy weights" that can be placed around the front frame. These are hard plastic or material weights.

The invention claimed is:

1. A foldable wheeled conveyance comprising a telescopic rear frame and a second frame pivotally mounted on the rear frame and in which the second frame will assume one of two stable positions with respect to the rear frame, a first position comprising a locked and open position projecting substantially forwards with respect to the rear frame and the second position comprising a folded position substantially adjacent the rear frame when the conveyance is folded; the rear frame comprised of a pair of spaced apart members joined together and each member having a rear wheel mounted at one end and a handle at the other end, wherein the rear frame is arcuate in side view;

the pivotal mounting of the second frame with respect to the rear frame is forward of a vertical plane between the centers of the rear wheels and an upper part of the rear frame; each of the spaced apart members comprises two portions slidably and lockably mounted with respect to one another and configured to enable telescoping of the rear frame when the conveyance is folded.

2. A foldable wheeled conveyance according to claim 1 wherein the rear frame additionally comprises an axle, on which the rear wheels are mounted, passing through the spaced apart members.

3. A foldable wheeled conveyance according to claim 1 wherein said second frame has one or a plurality of further wheels mounted thereon on pivot mountings, said pivot mountings being substantially vertical with respect to the ground when the wheeled conveyance is in a fully unfolded condition and placed on the ground and being foldable so that the further wheels may be folded away within the outline of the second or seat frame when the conveyance is folded.

4. A foldable wheeled conveyance according to claim 1 wherein the spaced apart members each comprise separate portions, a main side member and a lower portion, said lower portion partially within the main side members and lockable in each of two positions with respect to said side members to enable telescoping of the rear frame.

5. A foldable wheeled conveyance according to claim 4, wherein the pivotal mountings of said second frame are attached to the main side members of the spaced apart members.

6. A foldable wheeled conveyance according to claim 1 wherein the second frame is arcuate in side view.

7. A foldable wheeled conveyance according to claim 1 wherein the second frame is generally U-shaped and the second frame is pivotally mounted on the rear frame at points close to the end of each arm of the U.

8. A foldable wheeled conveyance according to claim 1 wherein it has a foldable seat mounted within the rear frame and the second frame, said seat extending below a line formed between the pivotal mount of the second frame and the rear frame when the conveyance is unfolded.

9. A foldable wheeled conveyance according to claim 8 wherein the seat is mounted within an aperture under a seat pan, said seat pan mounted on main side members and the second frame and hinged in the line formed between the pivotal mountings of the seat.

10. A foldable wheeled conveyance according to claim 1, wherein the second frame and main side members form between them a containment in which containers may be contained and supported by the seat when the conveyance is folded.

11. A foldable wheeled conveyance according to 1, including mounting means for attaching a container above the rear wheels when the conveyance is unfolded.

12. A foldable wheeled conveyance according to claim 1, wherein said container is a rucksack attached to said rear frame, said rucksack including carrying straps on a side of said rucksack opposite a side of the rucksack attached to said rear frame, such that said wheeled conveyance can be carried by said rucksack when said rucksack is carried by an individual.

13. A foldable wheeled conveyance comprising in combination
   a. a rear frame and a second frame which assumes one of two stable positions with respect to the rear frame, the first position being a locked, open, position projecting substantially forwards with respect to the rear frame and the second position being a folded, position substantially adjacent the rear frame when the conveyance is folded;
   b. the spaced apart members and the second frame arcuate in side view, such that the pivotal mounting of the second frame with respect to the first frame is forward of a vertical plane between the rear wheels and an upper part of the rear frame when the conveyance is in an unfolded position;
   c. the second frame having one or a plurality of further wheels mounted thereon on pivot mountings, said pivot mountings being substantially vertical with respect to the ground when the wheeled conveyance is in a fully unfolded condition and placed on the ground;
   d. the rear frame is made of a pair of spaced apart members joined together and each having a rear wheel mounted at one end and at least one handle mounted at another end;
   e. the spaced apart members each comprising a main side member and a lower portion, the lower portion partially within the main side member and lockable in each of two positions with respect to the main side members to enable telescoping of the rear frame; and
   f. pivotal mounts attached to the main side members in which the second frame is mounted and said second frame is lockable in each of two positions with respect to said rear frame.

* * * * *